United States Patent Office 3,344,084
Patented Sept. 26, 1967

3,344,084
REGENERATION OF ACRYLONITRILE
SYNTHESIS CATALYSTS
Roger S. Leland, La Marque, Tex., assignor to Monsanto
Company, a corporation of Delaware
No Drawing. Filed Sept. 23, 1963, Ser. No. 310,869
4 Claims. (Cl. 252—415)

The present invention relates to an improvement in the production of acrylonitrile. More particularly, it pertains to a method for regenerating or reactivating the copper chlorode catalysts employed for the production of acrylonitrile from acetylene and hydrogen cyanide.

It is well known that acrylonitrile can be produced by reacting acetylene with hydrogen cyanide (HCN) in the presence of an aqueous cuprous salt catalyst. The catalyst most commonly employed is the so-called Nieuwland catalyst which comprises essentially an aqueous solution of cuprous chloride, potassium and sodium chlorides, and hydrochloric acid. Instead of the alkali metal salts, ammonium chloride may be used to solubilize the cuprous chloride. Also the acidity of the catalyst may be attained by substituting other strong acids such as sulfuric acid, hydrobromic acid, and phosphoric acid for the hydrochloric acid mentioned. In the continuous operation of the process, the activity of the catalyst gradually diminishes until it becomes necessary to renew the total catalyst supply in order to maintain an economic level of production of acrylonitrile. The system is a complex one and there are a number of factors which contribute to the loss of activity or poisoning of the catalyst. By-products are formed from side reactions of impurities in the acetylene used, such as diacetylene, allene, allylene, etc., as well as from the interactions between unsaturated compounds, such as vinylacetylene, divinylacetylene, and cyanobutadiene, which arise in the reaction. Polymeric materials such as polyacrylic acids and polyamides also are thought to occur as impurities in the catalyst solution. Most of these by-products are carbon-containing compounds which appear as viscous tarry or resinous materials and which interfere with operation of the reactor as well as reduce catalyst efficiency. Ammonium chloride is continuously being formed, too, from the reaction of the ammonia arising from hydrolysis of acrylonitrile with hydrochloric acid and as it accumulates the activity of the catalyst gradually decreases.

Many methods have been proposed for restoring the activity of the cuprous chloride catalyst. Although they have met with varying degrees of success, most of the suggested procedures involve complex operations and result in high copper loss or recovery of copper values at a prohibitive cost. One of the more satisfactory methods is that which involves evaporating the water from the catalyst solution and thereafter heating the resulting substantially anhydrous salt mass to a temperature sufficiently high to convert the undesirable tarry or resinous materials into a solid carbonaceous material or slag and a molten salt mass or catalyst melt which contains the copper chloride and alkali metal salts. The melt is then separated from the slag and treated with water or water and HCl to produce a catalyst solution suitable for re-use in synthesizing additional acrylonitrile. However, recovery of copper values in this process is not all that is to be desired since in the acrylonitrile synthesis some of the copper is converted to copper cyanide and/or cyanide complexes which remain in the slag and are either lost or must be further treated for recovery of copper therefrom.

It is, therefore, an object of this invention to provide an improved process for the regeneration of the copper-containing catalysts used in the production of acrylonitrile from acetylene and HCN which is practical, economical, and which provides for maximum removal of tarry impurities with a minimum loss of copper. It is a more particular object of the invention to provide an improvement in the process for regeneration of such catalysts by heat treating or pyrolysis.

These and other objects and advantages of the invention which will become apparent from the following description can be accomplished by acidifying the spent catalyst solution by thoroughly admixing hydrochloric acid with it in an amount sufficient to provide from about one to about five moles of acid per mole of cyanide ($CN^-$) contained in the catalyst solution and thereafter heating the acidified solution to form a layered mass of molten salts and carbonaceous material. After a brief cooling period during which the solid carbonaceous material becomes dry and crusty or "sets up," the molten salt mass is withdrawn and run into water to form either a solution of the salts or a crystalline slurry of them suitable for charging to the acrylonitrile reactor.

The process can be carried out either stepwise or continuously. In one embodiment of the invention, the spent catalyst is acidified and charged to a suitable mixing vessel equipped with an agitator and heated at a temperature of at least 60° C. and preferably from about 105° C. to about 150° C. to drive off water and volatile impurities such as HCN and produce a substantially anhydrous salt mass which is a mixture comprising cuprous and alkali metal chlorides together with liquid tarry matter. Thereafter, the substantially anhydrous salt mass is charged to a suitable furnace where pyrolysis of the liquid tarry matter is carried out to convert it into solid carbonaceous material. The pyrolysis is effected by heating the dried salt mass to a temperature of at least 250° C. but below 400° C. while maintaining an inert atmosphere over the salt mass.

In another embodiment of the invention, after acidification of the spent catalyst, all of the volatile cyanide impurities are driven off but not all of the water is removed in the initial heating step. In this operation, a stripping gas is employed to facilitate removal of the HCN. In view of its extremely poisonous nature, provision for disposal of this volatile impurity as by burning, for example, must be made in any practical process. When a stripping gas such as methane, for example, is employed to drive off the HCN, lower temperatures, such as from about 75° to about 90° C., can be used in the initial step, a shorter heating cycle at these temperatures is required to free the catalyst of cyanide impurities, and the necessary agitation of the mass is achieved by sparging the gas through the catalyst solution. After the volatile cyanide impurity is removed, the resulting mixture is charged to a suitable furnace as, for example, one of the submerged combustion type, and heated as described above to drive off the remainder of the HCN, water, ammonium chloride, etc., and pyrolyze the tarry matter. If desired, the catalyst once freed of HCN can be stored for further treatment at a later time. In fact, the catalyst so treated using methane as a stripping gas is much easier to handle than the untreated spent catalyst solution since no salt drop-out or other handling difficulties encountered with the untreated material are experienced with the treated mixture.

In still another embodiment of the invention, the spent catalyst solution after acidification is charged to a suitable furnace or other apparatus and heated while subjected to agitation until all the water present and other volatile constituents are evaporated. The temperature is then increased to at least 250° C. but below 400° C. to convert the non-volatile impurities, i.e., the tarry matter, to solid carbonaceous material or slag. The salt melt formed while the pyrolysis of the non-volatile impurities takes place is withdrawn from the furnace and added to a water bath to form either a crystalline slurry or a solution which has the proper composition to be used as a catalyst.

In general, it is necessary to recover the values from spent catalyst when by-product tars have accumulated to the extent of about 5 to 6% by weight of the catalyst. A mixture containing over about 20% by weight is no longer useful commercially and must be removed from the reactor and either discarded or regenerated.

While the hydrochloric acid used to acidify the catalyst employed is preferably the concentrated acid of commerce, i.e., 37%, acid of any concentration can be employed provided it is not so dilute as to result in precipitation of copper chloride from the spent catalyst solution during the acidification step. The major consideration here is one of practicality and since the use of more dilute acid necessitates the removal of more water in the treating operation and in the case of very dilute acid creates handling problems, it is less advantageous. Also, while the amount of acid employed can vary from about one to about five moles per mole of cyanide in the spent catalyst, in preferred operation the acid-cyanide ratio is maintained at about 2:1.

It is preferable to maintain an inert atmosphere over the mixture being treated to pyrolyze the tarry matter therein. However, this aspect of the process is not critical and an oxidizing atmosphere can be employed if desired.

The invention is illustrated in the following examples which, however, are not to be construed as limiting it in any manner whatsoever. All parts given are by weight.

*Example 1*

About 695 parts of a catalyst solution used in the production of acrylonitrile and containing 27.4% by weight of copper, 1.75% cyanide, 7.1% ammonium chloride, and 4.75% of by-product tars was charged to an open glass vessel. To this was added 186 parts of 31.5% HCl with thorough mixing. The mixture was heated for about one hour up to a temperature of about 95° C. while it was sparged with natural gas and evolving vapors consisting predominantly of HCN were drawn off into a ventilating hood. At the end of this time, analysis of a sample of catalyst showed its cyanide content had been reduced to 0.03%.

The catalyst mixture was then transferred to a resin kettle and further heated up to a temperature of about 370° C. During this heating period, the remaining HCN, water, HCl, and ammonium salts were driven off as vapors while the catalytic mixture in the kettle was converted into a melt upon which floated a quantity of porous black char resulting from pyrolysis of the by-product tar. Heating was discontinued and the contents of the kettle were allowed to cool sufficiently for the char to consolidate into a dry crust. The catalyst melt was then tapped from the kettle and analyzed. It contained 39.1% by weight of copper and no by-product tar or ammonium chloride. Analysis of the char or crust showed it to contain 11.9% copper. Of the 695 parts of spent catalyst charged, 446.5 parts were recovered as the catalyst melt and 135.4 parts remainned as carbonaceous material or crust in the vessel. Thus, 174.5 g. of copper or 91.6% by weight of the copper charged was recovered by the treatment of the spent catalyst while all the tar had been removed.

The catalyst melt was poured while stirring into water to form a slurry of salt crystals which was returned to the catalytic reactor for synthesis of additional acrylonitrile.

*Example 2*

Approximately 3071 g. of the same spent catalyst used in Example 1 was charged to a kettle under a vacuum hood and heated gradually up to a temperature of about 370° C. Hydrocarbon gases, ammonia, water, and HCN were liberated from the heated mixture and it was converted into viscous melt with a solid carbonaceous material or slag floating upon its surface. After a short cooling period during which the slag consolidated into a dry crust, the fluid salt mass was withdrawn. Analysis of the melt showed it to contain 41.8% copper, no tar, and no ammonium chloride. The carbonaceous residue contained 30.0% copper. Approximately 1,152 g. of catalyst melt were obtained from treatment of the spent catalyst charge with 941 g. of the charge going to carbonaceous matter or char. Hence, 482 g. of the 841 g. of copper charged were recovered representing a yield of 57.3% by weight.

The catalyst melt when poured into a circulating stream of water at temperatures from about 25° to about 60° C. forms a slurry of salts suitable for re-charging to the reactor for synthesis of additional acrylonitrile.

It is clearly evident from a comparison of the foregoing examples that the addition of the proper amount of hydrochloric acid to the spent acrylonitrile catalyst prior to heating for purposes of regeneration provides for a significantly greater recovery of copper values from the spent catalyst than can be obtained by the conventional procedure which does not include the acidification step.

What is claimed is:

1. A process for regenerating an aqueous catalyst solution spent in the synthesis of acrylonitrile from acetylene and HCN containing cuprous chloride together with liquid tarry matter which comprises thoroughly admixing with said spent catalyst solution an amount of hydrochloric acid from about one to about five moles per mole of cyanide contained in said catalyst solution, heating said acidified solution to form a layered mass of molten salt mixture and solid carbonaceous material, withdrawing said molten salt mixture and adding it to water to form a slurry of said salts.

2. A process for regenerating an aqueous catalyst solution spent in the synthesis of acrylonitrile from acetylene and HCN containing cuprous chloride together with liquid tarry matter which comprises thoroughly admixing with said spent catalyst solution an amount of hydrochloric acid from about one to about five moles per mole of cyanide contained in said catalyst solution, heating said acidified solution to a temperature from about 105° C. to about 150° C. whereby a substantially anhydrous salt mass is obtained, heating said salt mass to a temperature of at least 250° C. but below 400° C. to convert it to a layered mass of molten salt mixture and solid carbonaceous material, withdrawing said molten salt mixture and adding it to water to form a slurry of said salts.

3. A process for regenerating an aqueous catalyst spent in the synthesis of acrylonitrile from acetylene and HCN containing cuprous chloride together with liquid tarry matter which comprises thoroughly admixing with said spent catalyst solution an amount of hydrochloric acid from about one to about five moles per mole of cyanide contained in said catalyst solution, heating said acidified solution to a temperature from about 75° C. to about 95° C. while sparging with an inert gas, thereafter heating said solution to a temperature of at least 250° C. but below 400° C. to convert it to a layered mass of molten salt mixture and solid carbonaceous materials, withdrawing said molten salt mixture and adding it to water to form a slurry of said salts.

4. A process for regenerating an aqueous catalyst solution spent in the synthesis of acrylonitrile from acetylene and HCN containing cuprous chloride together with liquid tarry matter which comprises thoroughly admixing two moles of hydrochloric acid with each mole of said spent catalyst solution, heating said acidified solution at a temperature of about 95° C. while sparging with methane, thereafter heating said solution to a temperature of about 370° C. to convert it to a layered mass of molten salt mixture and solid carbonaceous material, withdrawing said molten salt mixture and adding it to a circulating stream of water at a temperature from about 25° to about 60° C. to form a slurry of said salts.

References Cited

UNITED STATES PATENTS

| | | | |
|---|---|---|---|
| 1,526,525 | 2/1925 | Bucher | 23—151 |
| 1,915,152 | 6/1933 | Calcott et al. | 252—415 |
| 2,113,028 | 4/1938 | Kuentzel | 242—415 |
| 2,323,631 | 7/1943 | Stadler et al. | 252—413 |
| 2,763,676 | 9/1956 | Porret | 252—411 |

FOREIGN PATENTS

| | | |
|---|---|---|
| 822,866 | 11/1959 | Great Britain. |
| 916,185 | 1/1963 | Great Britain. |
| 513,070 | 2/1955 | Italy. |

OSCAR R. VERTIZ, *Primary Examiner.*

MAURICE A. BRINDISI, BENJAMIN HENKIN,
*Examiners.*

R. M. DAVIDSON, H. S. MILLER, *Assistant Examiners.*